US012627159B2

(12) United States Patent
Zhang et al.

(10) Patent No.: US 12,627,159 B2
(45) Date of Patent: May 12, 2026

(54) SWITCHABLE CHARGER WITH TYPE-A INTERFACE SUPPORTING PD PROTOCOL, DATA CABLE AND CHARGING DEVICE

(71) Applicant: VIVO MOBILE COMMUNICATION CO., LTD., Dongguan (CN)

(72) Inventors: Tao Zhang, Dongguan (CN); Junchen Wei, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 767 days.

(21) Appl. No.: 18/071,045

(22) Filed: Nov. 29, 2022

(65) Prior Publication Data

US 2023/0085923 A1 Mar. 23, 2023

Related U.S. Application Data

(63) Continuation of application No. PCT/CN2021/096695, filed on May 28, 2021.

(30) Foreign Application Priority Data

May 29, 2020 (CN) .......................... 202010479634.5

(51) Int. Cl.
*H01M 10/46* (2006.01)
*H01R 13/66* (2006.01)
(Continued)

(52) U.S. Cl.
CPC ........ *H02J 7/00045* (2020.01); *H01R 13/665* (2013.01); *H01R 13/70* (2013.01);
(Continued)

(58) Field of Classification Search
CPC .. H02J 7/0013; H02J 7/00034; H02J 7/00045; H02J 7/0042; H02J 7/007188; H02J 2207/30
(Continued)

(56) References Cited

U.S. PATENT DOCUMENTS 9,588,560 B2 3/2017 Talmola
11,205,906 B2 12/2021 Wang et al.
(Continued)

FOREIGN PATENT DOCUMENTS

CN 106415979 A 2/2017
CN 107181145 A 9/2017
(Continued)

OTHER PUBLICATIONS

Machine translation of CN 210327098 (Apr. 14, 2020) (Year: 2020).*

(Continued)

*Primary Examiner* — Edward Tso
(74) *Attorney, Agent, or Firm* — Harness, Dickey & Pierce, P.L.C.

(57) ABSTRACT

A charger includes a Type-A female socket, a PD charging processing unit, a non-PD charging processing unit, a data cable matching unit, and a first switching unit. The Type-A female socket includes a first communication pin. If the data cable matching unit determines, based on a matching signal transmitted via the first communication pin, that the charger is connected to a first to-be-charged device through a first data cable, and the first switching unit is connected to the first communication pin and the PD charging processing unit. If the data cable matching unit determines, based on a matching signal transmitted via the first communication pin, that the charger is connected to a second data cable or is connected to a second to-be-charged device through a data cable, the first switching unit is connected to the first communication pin and the non-PD charging processing unit.

12 Claims, 6 Drawing Sheets

(51) Int. Cl.
_H01R 13/70_ (2006.01)
_H02J 7/00_ (2006.01)
(52) U.S. Cl.
CPC .......... _H02J 7/0013_ (2013.01); _H02J 7/0042_
(2013.01); _H02J 2207/30_ (2020.01)
(58) Field of Classification Search
USPC ................................. 320/107, 111, 114, 115
See application file for complete search history.

(56) References Cited

U.S. PATENT DOCUMENTS

| 2016/0283423 | A1* | 9/2016 | Srivastava | .......... G06F 13/4068 |
| 2019/0372375 | A1 | 12/2019 | Kayama | |
| 2023/0170709 | A1* | 6/2023 | Liu | .................... H02J 7/00045 |
| | | | | 320/137 |

FOREIGN PATENT DOCUMENTS

| CN | 107706685 A | 2/2018 |
| CN | 107834628 A | 3/2018 |
| CN | 108233130 A | 6/2018 |
| CN | 207612082 U | 7/2018 |
| CN | 109327055 A | 2/2019 |
| CN | 110534988 A | 12/2019 |
| CN | 210327098 U | 4/2020 |
| CN | 111509816 A | 8/2020 |
| JP | 2020052959 A | 4/2020 |
| WO | WO-2016209302 A1 | 12/2016 |

OTHER PUBLICATIONS

First Office Action regarding Chinese Patent Application No. 202010479634.5, dated Jul. 5, 2021. Translation provided by Bohui Intellectual Property.
International Search Report and Written Opinion of the International Searching Authority regarding International Patent Application No. PCT/CN2021/096695, dated Aug. 30, 2021. Translation provided by Bohui Intellectual Property.
Extended European Search Report regarding European Patent Application No. 21812550.8, dated Oct. 20, 2023.

\* cited by examiner

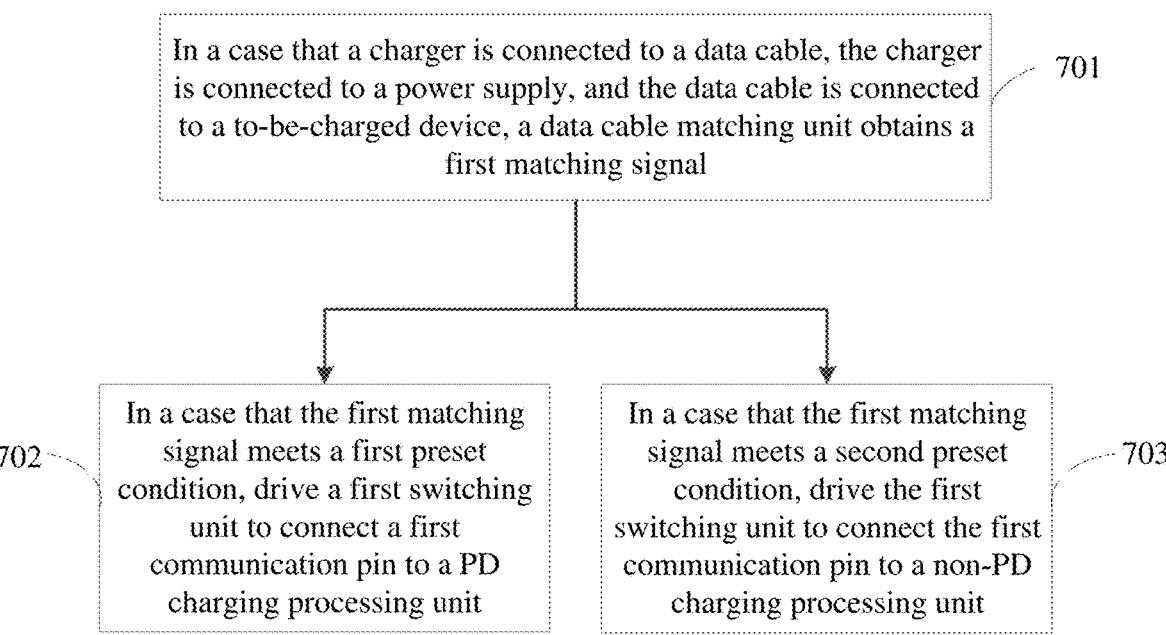

In a case that a charger is connected to a data cable, the charger is connected to a power supply, and the data cable is connected to a to-be-charged device, a data cable matching unit obtains a first matching signal — 701

In a case that the first matching signal meets a first preset condition, drive a first switching unit to connect a first communication pin to a PD charging processing unit — 702

In a case that the first matching signal meets a second preset condition, drive the first switching unit to connect the first communication pin to a non-PD charging processing unit — 703

FIG. 7

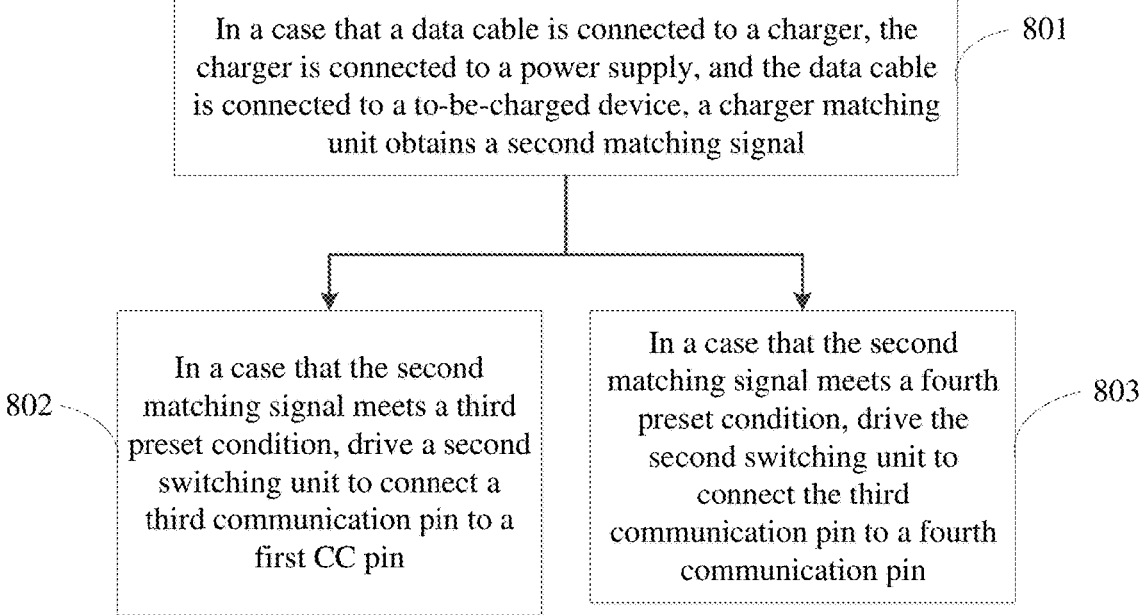

In a case that a data cable is connected to a charger, the charger is connected to a power supply, and the data cable is connected to a to-be-charged device, a charger matching unit obtains a second matching signal — 801

In a case that the second matching signal meets a third preset condition, drive a second switching unit to connect a third communication pin to a first CC pin — 802

In a case that the second matching signal meets a fourth preset condition, drive the second switching unit to connect the third communication pin to a fourth communication pin — 803

FIG. 8

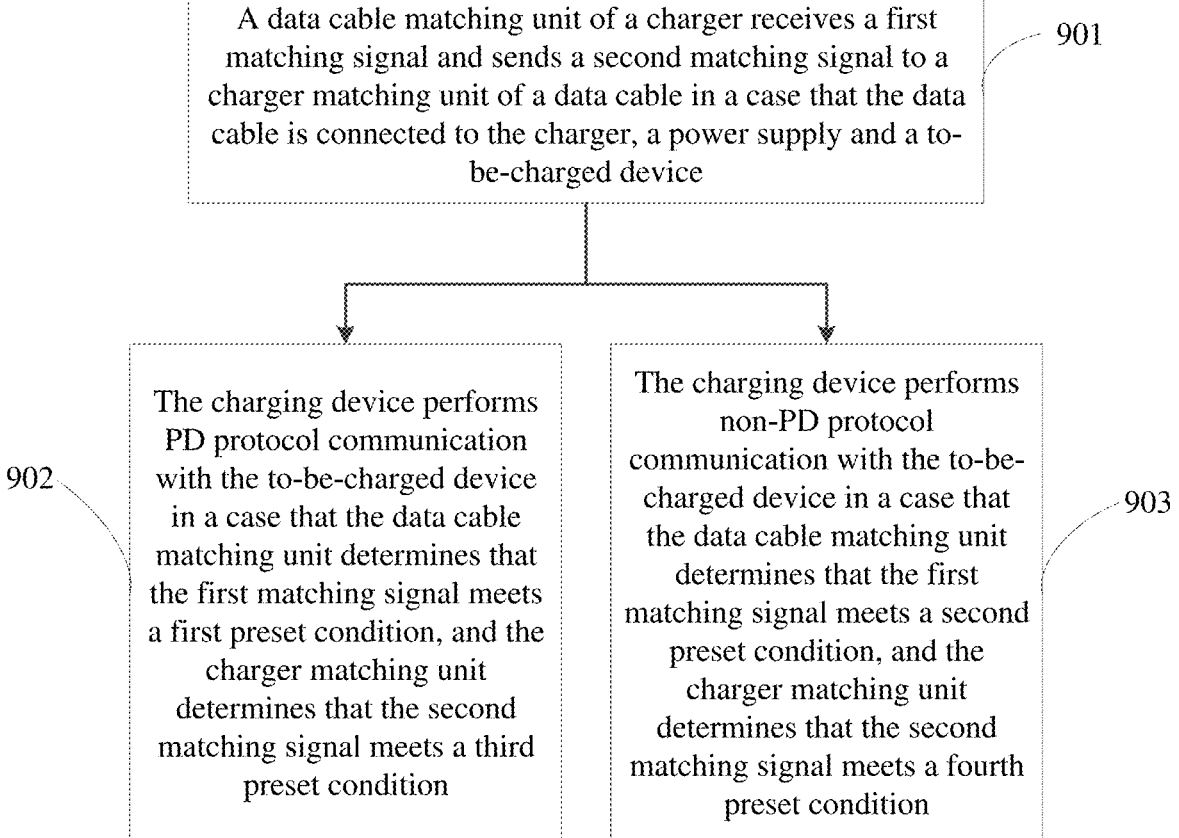

A data cable matching unit of a charger receives a first matching signal and sends a second matching signal to a charger matching unit of a data cable in a case that the data cable is connected to the charger, a power supply and a to-be-charged device    901

The charging device performs PD protocol communication with the to-be-charged device in a case that the data cable matching unit determines that the first matching signal meets a first preset condition, and the charger matching unit determines that the second matching signal meets a third preset condition    902

The charging device performs non-PD protocol communication with the to-be-charged device in a case that the data cable matching unit determines that the first matching signal meets a second preset condition, and the charger matching unit determines that the second matching signal meets a fourth preset condition    903

FIG. 9

SWITCHABLE CHARGER WITH TYPE-A INTERFACE SUPPORTING PD PROTOCOL, DATA CABLE AND CHARGING DEVICE

CROSS-REFERENCE TO RELATED APPLICATIONS

This application is a Bypass Continuation Application of PCT/CN2021/096695 filed on May 28, 2021, which claims priority to Chinese Patent Application No. 202010479634.5 filed on May 29, 2020, which are incorporated herein by reference in their entirety.

TECHNICAL FIELD

This application pertains to the field of communications technologies, and specifically relates to a charger, a data cable, and a charging device.

BACKGROUND

With the development of science and technology, fast charging is increasingly widely used.

In the related art, a power delivery (PD) protocol is generally used for fast charging. To support PD protocol charging, a charger needs to perform communication by using a CC signal cable. The charger that supports PD protocol charging generally employs a Standard-C (Type-C) interface and a Type-C to Type-C data cable. For a charger that employs a Standard-A (Type-A or Standard-A) interface, the charger performs communication by using a D+/D− signal cable, and cannot support PD protocol charging. However, currently, the most widely employed data cable is a data cable with a Type-A interface, and consequently a Type-A interface on a conventional data cable does not match a Type-C interface of a charger that supports PD protocol charging.

SUMMARY

According to a first aspect, an embodiment of this application provides a charger, including a Type-A female socket, a PD charging processing unit, a non-PD charging processing unit, a data cable matching unit, and a first switching unit, where the Type-A female socket includes a first communication pin, the first communication pin is connected to a first terminal of the first switching unit, a second terminal of the first switching unit is connected to the PD charging processing unit, a third terminal of the first switching unit is connected to the data cable matching unit, and a fourth terminal of the first switching unit is connected to the non-PD charging processing unit; and in a case that the charger is connected to a to-be-charged device through a data cable, if the data cable is a first data cable and the to-be-charged device is a first to-be-charged device, the first terminal of the first switching unit is connected to the second terminal of the first switching unit, and both the first terminal of the first switching unit is disconnected from the third terminal and the fourth terminal of the first switching unit; or in a case that the charger is connected to a to-be-charged device through a data cable, if the data cable is a second data cable or the to-be-charged device is a second to-be-charged device, the first terminal of the first switching unit is connected to the fourth terminal of the first switching unit, and the first terminal of the first switching unit is disconnected from the second terminal and the third terminal of the first switching unit, where when the data cable matching unit determines, based on a matching signal transmitted via the first communication pin, that the charger matches the data cable, the data cable is the first data cable, and when the data cable matching unit determines, based on a charging signal transmitted via the first communication pin, that PD protocol communication is performed between the to-be-charged device and the first charger, the to-be-charged device is the first to-be-charged device; or when the data cable matching unit determines, based on a matching signal transmitted via the first communication pin, that the charger does not match the data cable, the data cable is the second data cable, and when the data cable matching unit determines, based on a charging signal transmitted via the first communication pin, that non-PD protocol communication corresponding to the fourth communication pin is performed between the to-be-charged device and the charger, the to-be-charged device is the second to-be-charged device.

According to a second aspect, an embodiment of this application provides a data cable, including a Type-A male connector, a Type-C interface, and a cable connected between the Type-A male connector and the Type-C interface, where a charger matching unit and a second switching unit are disposed on the cable;

the Type-A male connector includes a third communication pin, the cable includes a first communication cable, the Type-C interface includes a fourth communication pin and a first CC pin, and the third communication pin is connected to a first terminal of the first communication cable;

a first terminal of the second switching unit is connected to a second terminal of the first communication cable, a second terminal of the second switching unit is connected to the charger matching unit, a third terminal of the second switching unit is connected to the fourth communication pin, and a fourth terminal of the second switching unit is connected to the first CC pin; and in a case that the data cable is connected to both a charger and a to-be-charged device, if the charger is a first charger and the to-be-charged device is a first to-be-charged device, the first terminal of the second switching unit is connected to the fourth terminal of the second switching unit, and the first terminal of the second switching unit is disconnected from the second terminal and the third terminal of the second switching unit; or in a case that the data cable is connected to both a charger and a to-be-charged device, if the charger is a second charger and the to-be-charged device is a second to-be-charged device, the first terminal of the second switching unit is connected to the third terminal of the second switching unit, and the first terminal of the second switching unit is disconnected from the second terminal and the fourth terminal of the second switching unit, where when the charger matching unit determines, based on a matching signal transmitted via the third communication pin, that the charger matches the data cable, the charger is the first charger, and when the charger matching unit determines, based on a charging signal transmitted via the third communication pin, that PD protocol communication is performed between the to-be-charged device and the first charger, the to-be-charged device is the first to-be-charged device; or when the charger matching unit determines, based on a matching signal transmitted via the third communication pin, that the charger does not match the data cable, the charger is the second charger, and when the charger matching unit determines, based on a charging signal transmitted via the third communication pin, that non-PD protocol communication corresponding to the fourth communication pin is performed between the to-be-charged device and the charger, the to-be-charged device is the second to-be-charged device.

According to a third aspect, an embodiment of this application provides a charging device, including a charger and a data cable connected to the charger, where the charger is the charger provided in the first aspect, the data cable is the data cable provided in the second aspect, and the first communication pin is connected to the third communication pin;

and in a case that the data cable successfully matches the charger and is not connected to the first to-be-charged device, the first terminal of the first switching unit is connected to the fourth terminal of the first switching unit, the first terminal of the first switching unit is disconnected from the second terminal and the third terminal of the first switching unit, the first terminal of the second switching unit is connected to the third terminal of the second switching unit, and the first terminal of the second switching unit is disconnected from the second terminal and the fourth terminal of the second switching unit; and in a case that the data cable successfully matches the charger and is connected to the first to-be-charged device, the first terminal of the first switching unit is connected to the second terminal of the first switching unit, the first terminal of the first switching unit is disconnected from the third terminal and the fourth terminal of the first switching unit, the first terminal of the second switching unit is connected to the fourth terminal of the second switching unit, and the first terminal of the second switching unit is disconnected from the second terminal and the third terminal of the second switching unit, where in a case that the data cable is connected to the first to-be-charged device, the charging device performs PD charging on the to-be-charged device through the first CC pin; or in a case that the data cable is connected to the second to-be-charged device, the charging device performs non-PD charging on the to-be-charged device through the fourth communication pin.

According to a fourth aspect, an embodiment of this application provides a charging method, applied to the charger provided in the first aspect, where the method includes:

in a case that the charger is connected to a data cable, the charger is connected to a power supply, and the data cable is connected to a to-be-charged device, obtaining, by a data cable matching unit, a first matching signal;

in a case that the first matching signal meets a first preset condition, driving a first switching unit to connect a first communication pin to a PD charging processing unit; and in a case that the first matching signal meets a second preset condition, driving the first switching unit to connect the first communication pin to a non-PD charging processing unit.

According to a fifth aspect, an embodiment of this application provides a charging method, applied to the data cable provided in the second aspect, where the method includes:

in a case that the data cable is connected to a charger, the charger is connected to a power supply, and the data cable is connected to a to-be-charged device, obtaining, by a charger matching unit, a second matching signal;

in a case that the second matching signal meets a third preset condition, driving a second switching unit to connect a second communication pin to a first CC pin; and in a case that the second matching signal meets a fourth preset condition, driving the second switching unit to connect the second communication pin to a fourth communication pin.

According to a sixth aspect, an embodiment of this application provides a charging method, applied to the charger provided in the third aspect, where the method includes:

receiving, by a data cable matching unit of the charger, a first matching signal and sending a second matching signal to a charger matching unit of the data cable in a case that the data cable is connected to the charger, a power supply and a to-be-charged device;

performing, by the charging device, PD protocol communication with the to-be-charged device in a case that the data cable matching unit determines that the first matching signal meets a first preset condition, and the charger matching unit determines that the second matching signal meets a third preset condition; and performing, by the charging device, non-PD protocol communication with the to-be-charged device in a case that the data cable matching unit determines that the first matching signal meets a second preset condition, and the charger matching unit determines that the second matching signal meets a fourth preset condition.

According to a seventh aspect, an embodiment of this application provides an electronic device. The electronic device includes a processor, a memory, and a program or an instruction that is stored in the memory and that can be run on the processor, where when the program or the instruction is executed by the processor, the steps of the method in the fourth aspect are implemented, or the steps of the method in the fifth aspect are implemented, or the steps of the method in the sixth aspect are implemented.

According to an eighth aspect, an embodiment of this application provides a non-transitory readable storage medium. The non-transitory readable storage medium stores a program or an instruction, and when the program or the instruction is executed by a processor, the steps of the method in the fourth aspect are implemented, or the steps of the method in the fifth aspect are implemented, or the steps of the method in the sixth aspect are implemented.

According to a ninth aspect, an embodiment of this application provides a chip. The chip includes a processor and a communications interface, the communications interface is coupled to the processor, and the processor is configured to run a program or an instruction to implement the steps of the method in the fourth aspect, or the steps of the method in the fifth aspect, or the steps of the method in the sixth aspect.

BRIEF DESCRIPTION OF DRAWINGS

FIG. 7 is a flowchart of a first charging method according to an embodiment of this application;

FIG. 8 is a flowchart of a second charging method according to an embodiment of this application; and FIG. 9 is a flowchart of a third charging method according to an embodiment of this application.

DESCRIPTION OF EMBODIMENTS

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

In the specification and claims of this application, the terms "first", "second", and the like are intended to distinguish between similar objects but do not describe a specific order or sequence. It should be understood that the data used in such a way is interchangeable in proper circumstances so that the embodiments of this application can be implemented in an order other than the order illustrated or described herein. In addition, in the specification and the claims, "and/or" represents at least one of connected objects, and a character "/" generally represents an "or" relationship between associated objects.

With reference to the accompanying drawings, a watch provided in the embodiments of this application is described in detail by using specific embodiments and application scenarios.

Figure 1:
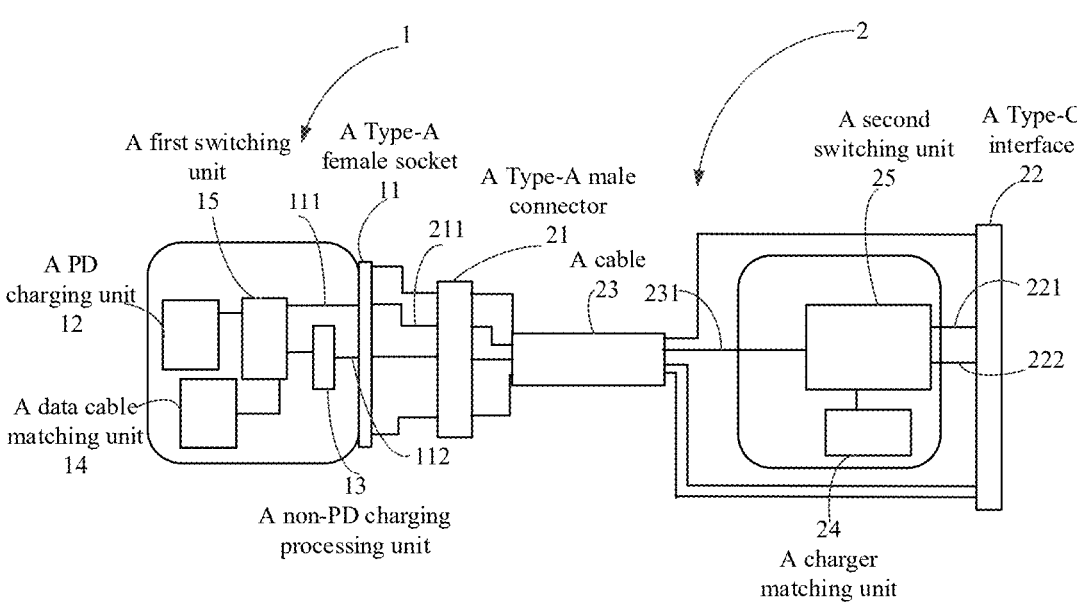
FIG. 1 is a circuit diagram of a charging device according to an embodiment of this application.
Figure 2:
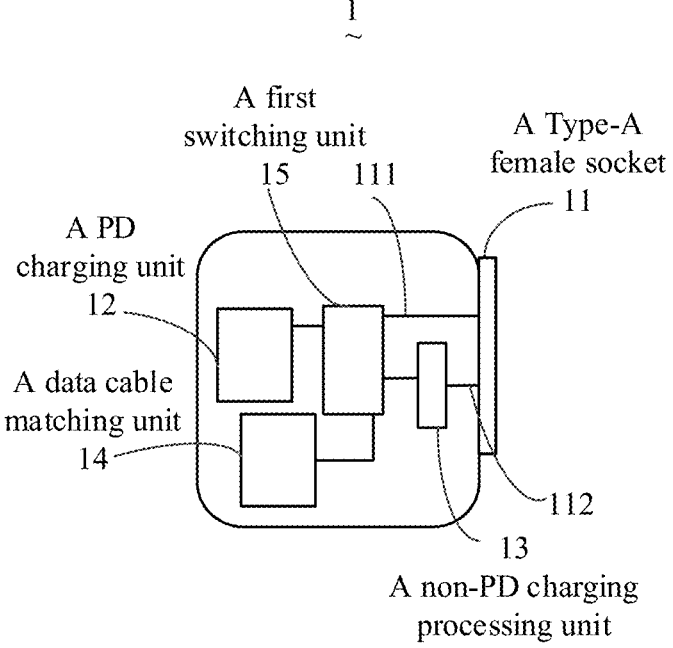
FIG. 2 is a circuit diagram of a charger according to an embodiment of this application.
Figure 3:
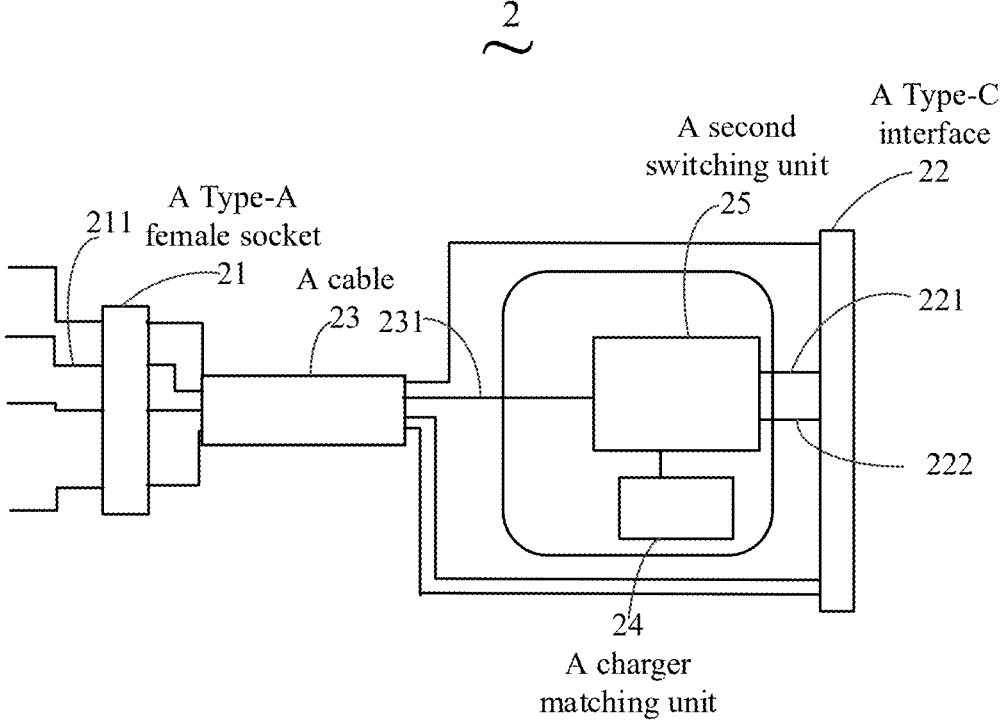
FIG. 3 is a circuit diagram of a data cable according to an embodiment of this application.

Referring to FIG. 1, FIG. 2, and FIG. 3, FIG. 1 is a circuit diagram of a charging device according to an embodiment of this application, FIG. 2 is a circuit diagram of a charger according to an embodiment of this application, and FIG. 3 is a circuit diagram of a data cable according to an embodiment of this application.

A charger 1 includes a Type-A female socket 11, a PD charging processing unit 12, a non-PD charging processing unit 13, a data cable matching unit 14, and a first switching unit 15. For example, the Type-A female socket 11 includes a first communication pin 111, the first communication pin 111 is connected to a first terminal of the first switching unit 15, a second terminal of the first switching unit 15 is connected to the PD charging processing unit 12, a third terminal of the first switching unit 15 is connected to the data cable matching unit 14, and a fourth terminal of the first switching unit 15 is connected to the non-PD charging processing unit 13.

In a case that the charger 1 is connected to a to-be-charged device through a data cable, if the data cable is a first data cable and the to-be-charged device is a first to-be-charged device, the first terminal of the first switching unit 15 is connected to the second terminal of the first switching unit 15, and both the first terminal of the first switching unit 15 is disconnected from the third terminal and the fourth terminal of the first switching unit 15; or in a case that the charger 1 is connected to a to-be-charged device through a data cable, if the data cable is a second data cable or the to-be-charged device is a second to-be-charged device, the first terminal of the first switching unit 15 is connected to the fourth terminal of the first switching unit 15, and the first terminal of the first switching unit 15 is disconnected from the second terminal and the third terminal of the first switching unit 15, where when the data cable matching unit 14 determines, based on a matching signal transmitted via the first communication pin 111, that the charger 1 matches the data cable, the data cable is the first data cable, and when the data cable matching unit 14 determines, based on a charging signal transmitted via the first communication pin 111, that PD protocol communication is performed between the to-be-charged device and the charger 1, the to-be-charged device is the first to-be-charged device; or when the data cable matching unit 14 determines, based on a matching signal transmitted via the first communication pin 111, that the charger 1 does not match the data cable, the data cable is the second data cable, and when the data cable matching unit 14 determines, based on a charging signal transmitted via the first communication pin 111, that non-PD protocol communication is performed between the to-be-charged device and the charger 1, the to-be-charged device is the second to-be-charged device.

Figure 4:
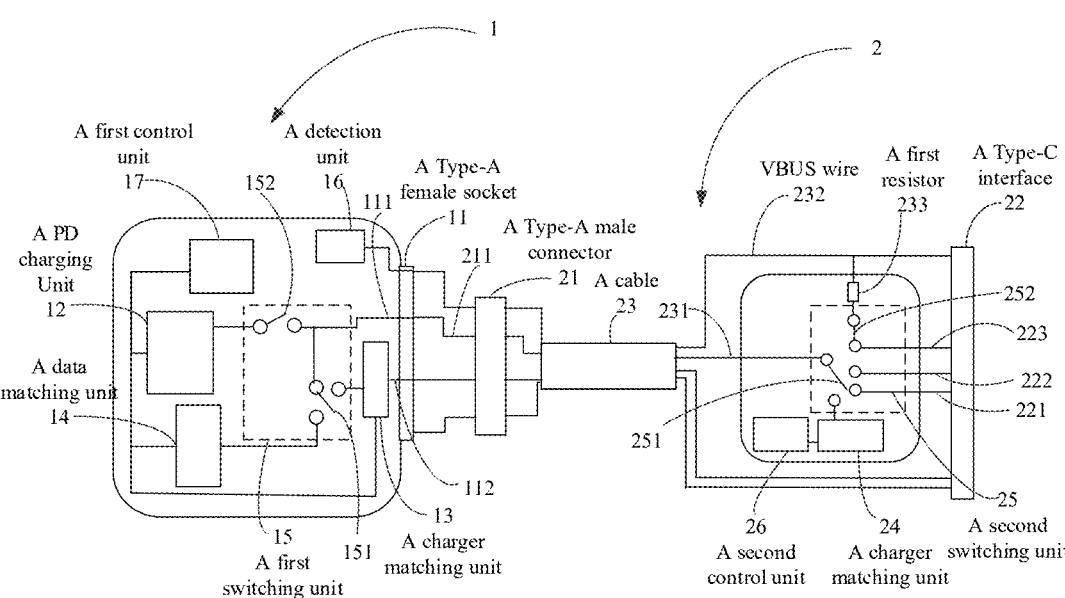
FIG. 4 is a circuit diagram of another charging device according to an embodiment of this application.

In specific implementation, the first data cable is a data cable that matches the charger 1, and may be the data cable 2 shown in FIG. 1 and FIG. 4.

It should be noted that at a same moment, the first terminal of the first switching unit 15 is connected to only one of the second terminal, the third terminal, and the fourth terminal of the first switching unit 15. In addition, in an initial state (that is, in a case that the charger 1 is not connected to a power supply or a data cable), the first terminal of the first switching unit 15 is connected to the third terminal, that is, the data cable matching unit 14 is connected to the first communication pin 111, so that the data cable matching unit 14 determines, according to a signal transmitted via the first communication pin 111, whether the charger 1 is connected to the first to-be-charged device through the first data cable. For example, in a case that a first matching signal obtained by the first switching unit 15 through the first communication pin 111 meets a first preset condition, the first terminal of the first switching unit 15 is connected to the second terminal of the first switching unit 15; or in a case that a first matching signal obtained by the first switching unit 15 through the first communication pin 111 meets a second preset condition, the first terminal of the first switching unit 15 is connected to the fourth terminal of the first switching unit 15, and the first matching signal is obtained from the to-be-charged device or the data cable 2 that matches the charger 1.

In application, the data cable matching unit 14 is configured to identify whether the data cable connected to the charger 1 is the first data cable that matches the charger 1. In a case that the matching succeeds, the first communication pin 111 may be connected to the non-PD charging processing unit 13 or the PD charging processing unit 12, and it is determined, according to communication information received by the non-PD charging processing unit 13 or the PD charging processing unit 12, that the to-be-charged device selects a PD communication channel or a non-PD communication channel, connect to the communication channel supported by the to-be-charged device.

In addition, the non-PD charging processing unit 13 may be a charging processing unit of any non-PD communications protocol, such as a charging processing unit of data minus (DM) charging communication and data positive (DP) charging communication. In this case, the first communication pin may be a D+ pin or a D− pin. Certainly, in specific implementation, the non-PD charging processing unit 13 may be alternatively a charging processing unit of another existing non-PD communications protocol or a charging processing unit of a future non-PD communications protocol. This is not specifically limited herein.

In addition, in specific implementation, the first preset condition may include:

the first communication pin 111 obtains the first matching signal or the first matching signal successfully matches a first preset matching signal prestored in the data cable matching unit 14; and PD protocol communication is performed between the to-be-charged device connected to the charger 1 and the charger 1.

In a case that the first matching signal is sent by the data cable, that the first communication pin 111 obtains the first matching signal or the first matching signal successfully matches the matching signal prestored in the data cable matching unit 14 may indicate that the data cable is the first data cable that matches the charger 1.

In a case that the first matching signal is sent by the to-be-charged device, that the first communication pin 111 obtains the first matching signal or the first matching signal successfully matches the matching signal prestored in the data cable matching unit 14 may indicate that the to-be-charged device is the first to-be-charged device that matches the charger 1.

In addition, that PD protocol communication is performed between the to-be-charged device connected to the charger 1 and the charger 1 may indicate that the to-be-charged device is a device that supports a PD fast charging function, and PD protocol communication is selected to perform PD fast charging.

In specific implementation, the second preset condition includes at least one of the following:

the first communication pin 111 does not obtain the first matching signal within a preset time after the charger 1 is connected to the power supply and the data cable;

the matching signal obtained by the first communication pin 111 does not match the first preset matching signal prestored in the data cable matching unit 14, or matches a second preset matching signal prestored in the data cable matching unit 14;

the to-be-charged device connected to the charger 1 does not support PD protocol communication; or non-PD protocol communication is performed between the to-be-charged device connected to the charger 1 and the charger 1.

The preset time may be 3 seconds, 5 seconds, or the like, and is used to increase a latency of receiving the first matching signal, so that it is possible to compensate for a time increased for the first communication pin 111 to receive the first matching signal during signal transmission, identification, and configuration of the to-be-charged device or the data cable.

In addition, in a case that the first matching signal is sent by the data cable, that the first communication pin 111 does not obtain the first matching signal within the preset time after the charger 1 is connected to the power supply and the data cable may indicate that the data cable is the conventional second data cable, and therefore the first matching signal is not sent to the charger 1. That the matching signal obtained by the first communication pin 111 does not match the first preset matching signal prestored in the data cable matching unit 14, or matches the second preset matching signal prestored in the data cable matching unit 14 may indicate that the data cable is the second data cable that does not match the charger 1.

In a case that the first matching signal is sent by the to-be-charged device, that the first communication pin 111 does not obtain the first matching signal within the preset time after the charger 1 is connected to the power supply and the data cable may indicate that the to-be-charged device is the second to-be-charged device that does not support non-PD fast charging. In this case, the charging device may perform conventional charging on the second to-be-charged device. A process of the conventional charging is the same as a conventional charging process in the prior art, and details are not described herein. In addition, that the matching signal obtained by the first communication pin 111 does not match the first preset matching signal prestored in the data cable matching unit 14, or matches the second preset matching signal prestored in the data cable matching unit 14 may indicate that the to-be-charged device is the second to-be-charged device that supports non-PD fast charging and selects a non-PD fast charging function for charging, where the first preset matching signal may be a PD charging signal when the second to-be-charged device selects the non-PD fast charging function, and the second preset matching signal may be a non-PD charging signal when the to-be-charged device selects the non-PD fast charging function.

It should be noted that if the first communication pin may be one of a D+ pin and a D− pin. In a case that the data cable connected to the charger 1 is the second data cable that does not match the charger 1, the first terminal of the first switching unit 15 is connected to the fourth terminal of the first switching unit 15, and the other of the D+ pin and the D− pin is connected to the non-PD charging processing unit 13.

In specific implementation, each of the first matching signal and the second matching signal may be a digital signal. For example, in a case that the charger 1 is connected to the power supply and is connected to the to-be-charged device through the first data cable, the data cable matching unit 14 generates the second matching signal, and transmits the second matching signal to a charger matching unit 24 in the first data cable through the first communication pin 111 connected to the data cable matching unit 14 and a third communication pin 211 in the first data cable or to the to-be-charged device through the first data cable, and the charger matching unit 24 or the to-be-charged device generates the first matching signal in response to the second matching signal, and transmits the first matching signal to the data cable matching unit 14 through the first communication pin 111. When obtaining the first matching signal, the data cable matching unit 14 determines that the data cable connected to the charger 1 is the first data cable that matches the charger 1 or determines that the first to-be-charged device selects the PD fast charging function, to connect the first terminal of the first switching unit 15 to the second terminal of the first switching unit 15.

In addition, each of the first matching signal and the second matching signal may be alternatively an analog signal, and the first switching unit 15 may perform switching according to the analog signal.

In specific implementation, the PD charging processing unit 12 includes a CC logic controller and a PD controller, and the CC logic controller is connected to the PD controller. When the PD charging processing unit 12 is connected to the first communication pin 111, the CC logic controller can perform CC protocol communication through the first communication pin 111, and the PD controller performs the PD fast charging function according to CC protocol communication information received by the CC logic controller, thereby improving charging efficiency of the to-be-charged device.

In specific implementation, in a case that the first data cable shown in FIG. 4 detects that the power supply is connected, the charger matching unit 24 in the first data cable first sends the first matching signal to the charger 1, and the data cable matching unit 14 in the charger 1 feeds back the second matching signal to the charger matching unit 24 in response to the first matching signal. This is not specifically limited herein.

It should be noted that in specific implementation, the charger 1 further includes a charging module, and a power bus (VBUS) pin and a ground (GND) pin are further disposed in the Type-A female socket 11. For example, the GND pin, the D+ pin, the D− pin, and the VBUS pin are disposed on the Type-A female socket 11. The first communication pin may be any one of the D+ pin and the D− pin. In addition, a structure and a working principle of the charging module, the VBUS pin, and the GND pin are the same as a structure and a working principle of the charging module, the VBUS pin, and the GND pin in the prior art. Details are not described herein.

According to the charger provided in this embodiment of this application, in a case that a data cable matching unit determines, based on a matching signal transmitted via a first communication pin, that the charger is connected to a first to-be-charged device through a first data cable, a first switching unit is connected to the first communication pin and a PD charging processing unit in a Type-A female socket, to perform PD protocol communication by using the first communication pin; or in a case that a data cable matching unit determines, based on a matching signal transmitted via a first communication pin, that the charger is connected to a second data cable or connected to a second to-be-charged device through the data cable, a first switching unit is connected to the first communication pin and a non-PD charging processing unit in a Type-A female socket, to perform non-PD protocol communication by using the first communication pin. In this way, in a case that the first communication pin is connected to the PD charging processing unit, a PD fast charging function can be provided, so that the charger can support PD protocol charging through a Type-A interface.

In an optional implementation, as shown in FIG. 4, a detection unit 16 may be further disposed in the first processing module 12 of the charger 1, and the detection unit 16 is connected to power cabling in the charger 1, to determine, according to a value of an electrical signal on the power cabling, whether the charger 1 is connected to the to-be-charged device.

In a case that the charger 1 is connected to the to-be-charged device and PD protocol communication is performed between the to-be-charged device and the charger 1, the first matching signal meets the first preset condition; or in s case that the charger 1 is connected to the to-be-charged device and non-PD protocol communication is performed between the to-be-charged device and the charger 1, the first matching signal meets the second preset condition.

For example, that the detection unit 16 is connected to the power cabling in the charger 1 may be that the detection unit 16 is connected to the VBUS pin in the Type-A female socket 11. When the charger 1 is connected to the to-be-charged device and the power supply, the electrical signal on the power cabling changes, for example, a current increases. Therefore, in a case that the detection unit 16 detects that the current is greater than a preset current value, it is determined that the charger 1 is connected to the power supply and the to-be-charged device, so that when the charger 1 is connected to the power supply and the to-be-charged device, the first processing module 12 can start to detect whether the first matching signal is received on the first communication pin 111, and stops detection in a case that the first matching signal is not obtained within a preset time after the detection is started, and the first switching unit 15 is connected to the first communication pin and the non-PD charging processing unit 13.

In addition, as shown in FIG. 4, a first control unit 17 may be further disposed in the charger 1. The first control unit 17 is connected to the PD charging processing unit 12, the non-PD charging processing unit 13, the data cable matching unit 14, the first switching unit 15, and the detection unit 16. Therefore, when the detection unit 16 detects that the charger 1 is connected to the power supply and the to-be-charged device, the data cable matching unit 14 is driven to start to detect whether the first matching signal is received on the first communication pin, and the data cable matching unit 14 is driven to perform matching on the first matching signal. In a case that the first matching signal meets the first preset condition after the matching, the first switching unit 15 is driven to connect the first communication pin to the PD charging processing unit 12, and the PD charging processing unit 12 is driven to perform PD fast charging on the to-be-charged device; or in a case that the first matching signal meets the second preset condition after the matching, the first switching unit 15 is driven to connect the first communication pin to the non-PD charging processing unit 12, and the non-PD charging processing unit 12 is driven to perform non-PD charging on the to-be-charged device.

In this implementation, the detection unit 16 detects the electrical signal on the power cabling, to determine whether the charger 1 is connected to the power supply and whether the charger 1 is connected to the to-be-charged device through data cable.

In an optional implementation, as shown in FIG. 4, the first switching unit 15 includes a first switch 151 and a second switch 152.

A first terminal of the first switch 151 is connected to the first communication pin 111, a second terminal of the first switch 151 is connected to the data cable matching unit 14, and a third terminal of the first switch 151 is connected to the non-PD charging processing unit 13; and a first terminal of the second switch 152 is connected to the first communication pin 111, and a second terminal of the second switch 152 is connected to the PD charging processing unit 12, where in a case that the charger 1 is connected to the to-be-charged device through the data cable, if the data cable is the first data cable and the to-be-charged device is the first to-be-charged device, the first terminal of the first switch 151 is disconnected from the second terminal and the third terminal of the first switch 151, and the second switch 152 is closed; or if the data cable is the second data cable or the to-be-charged device is the second to-be-charged device, the first terminal of the first switch 151 is connected to the third terminal of the first switch 151, the first terminal of the first switch 151 is disconnected from the second terminal of the first switch 151, and the second switch 152 is open.

In specific implementation, each of the first switch 151 and the second switch 152 may be a switch controlled by an analog signal, for example, a transistor or a MOS transistor. When a value of an electrical signal on the first communication pin 111 changes, the first switch 151 and the second switch 152 are connected or disconnected according to the value of the electrical signal on the first communication pin 111. In addition, each of the first switch 151 and the second switch 152 may be a switch controlled by a digital signal. For example, as shown in FIG. 4, the first charging processing module 12 further includes the first control unit 17, and the first control unit 17 is directly or indirectly connected to the first switch 151 and the second switch 152, so that the first switch 151 and the second switch 152 are connected or disconnected according to a control signal sent by the first control unit 17.

In this implementation, the first switching unit 15 is set to two switches, thereby simplifying a structure and a control process of the first switching unit 15.

In an optional implementation, as shown in FIG. 4, the non-PD charging processing unit 13 is a charging processing unit of a D+/D− communications protocol, the Type-A female socket 11 further includes a second communication pin 112, the second communication pin 112 is connected to the non-PD charging processing unit 13, the first communication pin 111 is one of a first D+ pin and a first D− pin, and the second communication pin 112 is the other of the first D+ pin and the first D− pin.

In this implementation, the non-PD charging processing unit 13 can implement a communication process in a non-PD charging protocol by using the D+ pin and the D− pin.

It should be noted that a specific principle and a process of performing DM and DP charging communication through the D+ pin and the D− pin are the same as a specific principle and a process of DM and DP charging communication in the prior art. Details are not described herein.

In addition, in a case that the first switching unit 15 is connected or not connected to the first communication pin 111 and the PD charging processing unit 12, the second communication pin 112 is always connected to the non-PD charging processing unit 13.

In this implementation, in a case that the first communication pin 111 is not connected to the PD charging processing unit 12, the first switching unit 15 can connect the first communication pin 111 to a DM/DP charging processing unit, so that a DM/DP charging function can be provided. In a case that the first communication pin 111 is connected to the PD charging processing unit 12, a DM/DP charging channel is not connected. In implementation, it can be determined, according to selection of the to-be-charged device, any one of a PD charging channel or the DM/DP charging channel is connected.

In an optional implementation, the data cable matching unit 14 may be a first ID identification subunit.

In addition, in a case that the charger 1 further includes the first control unit 17, the first control unit 17 is connected to both the data cable matching unit 14 and the first switching unit 15, where the first control unit 17 is configured to: when the data cable matching unit 14 obtains a first matching signal through the first communication pin 111 or when the data cable matching unit 14 does not obtain a first matching signal through the first communication pin 111 within a preset time, drive the first terminal of the first switching unit 15 to be connected to the fourth terminal of the first switching unit 15 and the first terminal of the first switching unit 15 to be disconnected from the second terminal and the third terminal of the first switching unit 15, where the first matching signal is generated by the first data cable connected to the charger and not connected to the to-be-charged device; and the first control unit 17 is further configured to: when the data cable matching unit 14 obtains a first PD charging signal through the first communication pin 111, drive the first terminal of the first switching unit 15 to be connected to the second terminal of the first switching unit 15 and the first terminal of the first switching unit 15 to be disconnected from the third terminal and the fourth terminal of the first switching unit 15, where the first PD charging signal is generated by the first to-be-charged device connected to the charger 1 through the first data cable.

In specific implementation, in a case that the data cable matching unit 14 identifies that the first matching signal and the first PD charging signal transmitted via the first communication pin 111 meet the first preset condition, the data cable matching unit 14 sends a first control signal to the first control unit 17; and the first control unit 17 is configured to: in response to the first control signal, control the first terminal of the first switching unit 15 to be connected to the second terminal of the first switching unit 15 and the first terminal of the first switching unit 15 to be disconnected from the third terminal and the fourth terminal of the first switching unit 15; or in a case that the data cable matching unit 14 identifies that the first matching signal or the first PD charging signal transmitted via the first communication pin 111 meet the second preset condition, the data cable matching unit 14 sends a second control signal to the first control unit 17; and the first control unit 17 is configured to: in response to the second control signal, control the first terminal of the first switching unit 15 to be connected to the fourth terminal of the first switching unit 15 and the first terminal of the first switching unit 15 to be disconnected from the second terminal and the third terminal of the first switching unit 15.

In specific implementation, the first control unit 17 may be any logic control unit, such as a microcontroller unit (MCU). In addition, as shown in FIG. 4, the logic control unit 15 may be further connected to the PD charging processing unit 12 and the non-PD charging processing unit 13, to control the PD charging processing unit 12 to perform PD charging logic processing, or control the non-PD charging processing unit 13 to perform non-PD charging logic processing.

In addition, the ID identification unit is configured to perform identity identification on the data cable connected to the charger 1, and may determine whether the data cable is a data cable that matches the charger 1 by using a digital signal or an analog signal obtained on the first communication pin 111 for identity identification. In a case that the data cable matches the charger 1, it is determined that the first matching signal meets the first preset condition, or in a case that the data cable does not match the charger 1, it is determined that the first matching signal meets the second preset condition.

In addition, after the charger 1 matches the data cable, a charging signal of the to-be-charged device may be further received, where the charging signal may carry a charging protocol selected by the to-be-charged device. For example, in a case that the to-be-charged device selects a PD charging protocol and the charger 1 is connected to the first data cable, a PD charging channel is connected, that is, the first communication pin and the PD charging processing unit are connected. In a case that the to-be-charged device selects a non-PD charging protocol, a non-PD charging channel is connected, that is, the first communication pin and the non-PD charging processing unit are connected.

In this implementation, the ID identification unit performs identity identification on the data cable connected to the charger 1, to determine whether the data cable is a data cable that matches the charger 1, and transmits a matching result to the first control unit 17, so as to provide a basis for a control logic of the first control unit 17. Therefore, in a case that the charger 1 is connected to the first data cable 2, the first control unit 17 controls the first terminal of the first switching unit 15 to be connected to the fourth terminal of the first switching unit 15, to receive a charging signal of the to-be-charged device through the non-PD charging processing unit, so as to subsequently adjust a connection state of the first switching unit 15 according to the charging signal.

Figure 5:
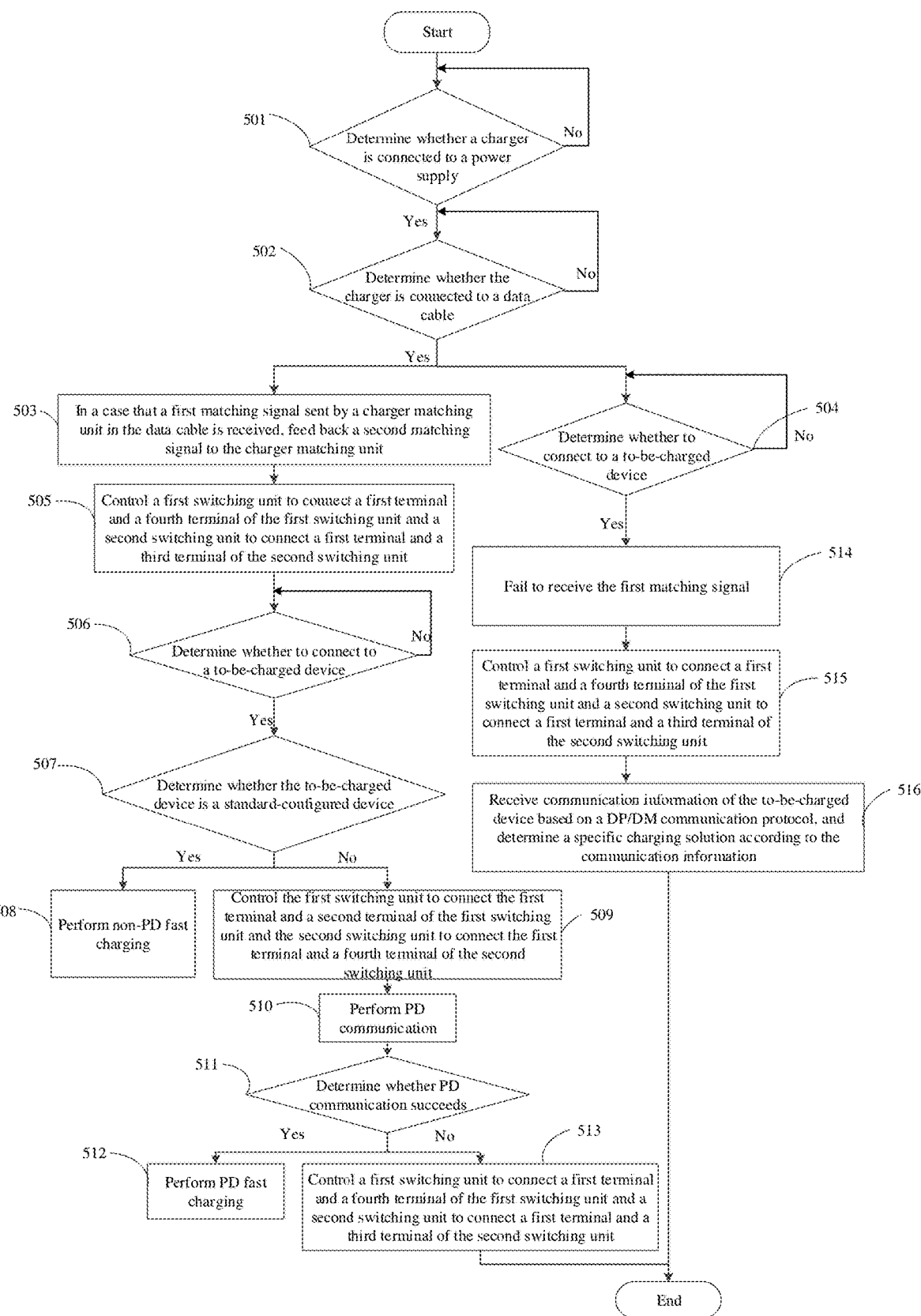
FIG. 5 is a first working flowchart of a charging device according to an embodiment of this application.

As shown in FIG. 5, the following uses an example to describe a working procedure of a charging device including the charger 1 in the embodiment shown in FIG. 4. The charging device may perform the following steps:

Step 501: Determine whether a charger is connected to a power supply.

Step 502 is performed in a case that a determining result of this step is "yes"; otherwise, this step is continuously and repeatedly performed.

Step 502: Determine whether the charger is connected to a data cable.

Step 503 or step 504 is performed in a case that a determining result of this step is "yes"; otherwise, this step is continuously and repeatedly performed.

For example, step 503 is performed in a case that the data cable connected to the charger matches the charger, or step 504 is performed in a case that the data cable connected to the charger does not match the charger.

Step 503: In a case that a first matching signal sent by a charger matching unit in the data cable is received, feed back a second matching signal to the charger matching unit.

Step 505 is performed in a case that the second matching signal is successfully fed back.

Step 505: Control a first switching unit to connect a first terminal and a fourth terminal of the first switching unit and a second switching unit to connect a first terminal and a third terminal of the second switching unit.

It should be noted that, in a case that the charging device is not connected to the power supply, the first switching unit connects the first terminal and a third terminal of the first switching unit, and the second switching unit connects the first terminal and a second terminal of the second switching unit.

In addition, in this step, in a case that the second switching unit further includes a fifth terminal and a sixth terminal, the second switching unit further connects the fifth terminal and the sixth terminal of the second switching unit.

In this case, a non-PD protocol charging channel in the charger is connected, and a PD protocol charging channel is not connected.

Step 506: Determine whether to connect to a to-be-charged device.

Step 507 is performed in a case that a determining result of this step is "yes"; otherwise, this step is continuously and repeatedly performed.

Step 507: Determine whether the to-be-charged device is a standard-configured device.

In specific implementation, the standard-configured device supports a charging manner of a standard-configured fast charging protocol (non-PD charging protocol).

Step 508 is performed in a case that a determining result of this step is "yes"; otherwise, step 509 is performed.

Step 508: Perform non-PD fast charging.

Step 509: Control the first switching unit to connect the first terminal and a second terminal of the first switching unit and the second switching unit to connect the first terminal and a fourth terminal of the second switching unit.

In addition, in this step, in a case that the second switching unit further includes a fifth terminal and a sixth terminal, the second switching unit further disconnects the fifth terminal from the sixth terminal of the second switching unit.

Step 510: Perform PD communication.

Step 511: Determine whether PD communication succeeds.

Step 512 is performed in a case that a determining result of this step is "yes"; otherwise, step 513 is performed.

Step 512: Perform PD fast charging.

Step 513: Control a first switching unit to connect a first terminal and a fourth terminal of the first switching unit and a second switching unit to connect a first terminal and a third terminal of the second switching unit.

In addition, in this step, in a case that the second switching unit further includes a fifth terminal and a sixth terminal, the second switching unit further connects the fifth terminal and the sixth terminal of the second switching unit.

After this step, communication information of the to-be-charged device based on a DP/DM communication protocol may be received, and a specific charging solution is determined according to the communication information.

Step 504: Determine whether to connect to a to-be-charged device.

Step 514 is performed in a case that a determining result of this step is "yes"; otherwise, this step is continuously and repeatedly performed.

Step 514: Fail to receive the first matching signal.

Step 515: Control a first switching unit to connect a first terminal and a fourth terminal of the first switching unit and a second switching unit to connect a first terminal and a third terminal of the second switching unit.

It should be noted that, in a case that the charging device is not connected to the power supply, the first switching unit connects the first terminal and a third terminal of the first switching unit, and the second switching unit connects the first terminal and a second terminal of the second switching unit.

In addition, in this step, in a case that the second switching unit further includes a fifth terminal and a sixth terminal, the second switching unit further connects the fifth terminal and the sixth terminal of the second switching unit.

Step 516: Receive communication information of the to-be-charged device based on a DP/DM communication protocol, and determine a specific charging solution according to the communication information.

Referring to FIG. 1 and FIG. 3, an embodiment of this application further provides a data cable. As shown in FIG. 3, a data cable 2 includes a Type-A male connector 21, a Type-C interface 22, and a cable 23 connected between the Type-A male connector 21 and the Type-C interface 22, where a charger matching unit 24 and a second switching unit 25 are disposed on the cable 23.

For example, the Type-A male connector 21 includes a third communication pin 211, the cable 23 includes first communication cable 231, a first terminal of the first communication cable 231 is connected to the third communication pin 211, and the Type-C interface 22 includes a first CC pin 221 and a fourth communication pin 222; and a first terminal of the second switching unit 25 is connected to a second terminal of the first communication cable 231, a second terminal of the second switching unit 25 is connected to the charger matching unit 24, a third terminal of the second switching unit 25 is connected to the fourth communication pin 222, and a fourth terminal of the second switching unit 25 is connected to the first CC pin 221.

In a case that the data cable 2 is connected to both a charger and a to-be-charged device, if the charger is a first charger and the to-be-charged device is a first to-be-charged device, the first terminal of the second switching unit 25 is connected to the fourth terminal of the second switching unit 25, and the first terminal of the second switching unit 25 is disconnected from the second terminal and the third terminal of the second switching unit 25; or in a case that the data cable 2 is connected to both a charger and a to-be-charged device, if the charger is a second charger and the to-be-charged device is a second to-be-charged device, the first terminal of the second switching unit 25 is connected to the third terminal of the second switching unit 25, and the first terminal of the second switching unit 25 is disconnected from the second terminal and the fourth terminal of the second switching unit 25, where when the charger matching unit 24 determines, based on a matching signal transmitted via the third communication pin 211, that the charger matches the data cable 2, the charger is the first charger, and when the charger matching unit 24 determines, based on a charging signal transmitted via the third communication pin 211, that PD protocol communication is performed between the to-be-charged device and the first charger, the to-be-charged device is the first to-be-charged device; or when the charger matching unit 24 determines, based on a matching signal transmitted via the third communication pin 211, that the charger does not match the data cable 2, the charger is the second charger, and when the charger matching unit 24 determines, based on a charging signal transmitted via the third communication pin 211, that non-PD protocol communication is performed between the to-be-charged device and the charger, the to-be-charged device is the second to-be-charged device.

In specific implementation, the first charger is a charger that matches the charger 2, and may be the charger 1 shown in FIG. 1 and FIG. 4.

It should be noted that at a same moment, the first terminal of the second switching unit 25 is connected to only one of the second terminal, the third terminal, and the fourth terminal of the second switching unit 25. In addition, in an initial state (for example, a case that the data cable 2 is not connected to the charger; a case that the charger connected to the data cable 2 is not connected to the power supply; or a case that the data cable 2 is connected to a unmatched charger), the first terminal of the second switching unit 25 is connected to the second terminal, that is, the charger matching unit 24 is connected to the third communication pin 211, so that the charger matching unit 24 determines, according to a signal transmitted on the third communication pin 211, whether the data cable 2 is connected to the first charger and the first to-be-charged device. For example, in a case that the second matching signal obtained by the charger matching unit 24 through the third communication pin 211 meets the third preset condition, the first terminal of the second switching unit 25 is connected to the fourth terminal of the second switching unit 25. In a case that the second matching signal obtained by the charger matching unit 24 through the third communication pin 211 meets the fourth preset condition, the first terminal of the second switching unit 25 is connected to the third terminal of the second switching unit 25, and the second matching signal is obtained from the to-be-charged device connected to the data cable 2 or the first charger 1 connected to the data cable 2.

The third preset condition corresponds to the first preset condition in the foregoing charger embodiment, and the fourth preset condition corresponds to the second preset condition in the foregoing charger embodiment. Details are not described herein again.

In this embodiment of this application, in a case that the data cable 2 is connected to the charger 1 shown in FIG. 1, FIG. 2, or FIG. 4, the first communication cable can be switched between CC communication cabling and D+/D− communication cabling, to perform PD fast charging on a to-be-charged device that supports a PD fast charging function and perform non-PD protocol charging on a to-be-charged device that does not support a PD fast charging function. In addition, in a case that the data cable 2 is connected to another unmatched charger, only a non-PD protocol charging channel is provided, so that non-PD protocol charging is performed on the to-be-charged device.

In an optional implementation, the Type-C interface 22 further includes a second CC pin 223, a first resistor 233 is further disposed on the cable 23, a first terminal of the first resistor 233 is connected to VBUS wire 232 in the cable 23, the second switching unit 25 further includes a fifth terminal and a sixth terminal, the fifth terminal of the second switching unit 25 is connected to a second terminal of the first resistor 233, and the sixth terminal of the second switching unit 25 is connected to the second CC pin 223, where in a case that the data cable 2 is connected to both the first charger and the first to-be-charged device, the fifth terminal of the second switching unit 25 is disconnected from the sixth terminal of the second switching unit 25; or in a case that the data cable 2 is connected to the second charger or to the second to-be-charged device, the fifth terminal of the second switching unit 25 is connected to the sixth terminal of the second switching unit 25.

In addition, in a default case (for example, a case that the data cable 2 is not connected to the charger; a case that the charger connected to the data cable 2 is not connected to the power supply; or a case that the data cable 2 is connected to a unmatched charger), the first terminal of the second switching unit 25 may be connected to the third terminal of the second switching unit 25, and the fifth terminal of the second switching unit 25 may be connected to the sixth terminal of the second switching unit 25. In this case, the first resistor 233 is used as a pull-up resistor to pull up the second CC pin 223 to be connected to the VBUS wire 232. In this way, in a case that the data cable 2 is connected to the power supply, the second CC pin 223 can be used to connect the VBUS wire 232 to a CC pin on the to-be-charged device to support a non-PD charging function. It should be noted that, in a case that the second CC pin 223 is connected to the VBUS wire 232 through the pull-up resistor, the Type-C interface has a same structure and a same working principle as the Type-C interface in the conventional technology. Details are not described herein.

In this implementation, in a case that the data cable 2 is connected to both the first charger and the first to-be-charged device, the fifth terminal of the second switching unit 25 is disconnected from the sixth terminal of the second switching unit 25, to disconnect the second CC pin 223 from the VBUS wire 232 and connect the first CC pin 221 to the first communication cable 231, so as to perform CC protocol communication by using the first CC pin 221 and the first communication cable 231 and support a PD fast charging function.

In an optional implementation, the second switching unit 25 includes a third switch 251 and a fourth switch 252;

a first terminal of the third switch 251 is connected to the second terminal of the first communication cable 231, a second terminal of the third switch 251 is connected to the charger matching unit 242, a third terminal of the third switch 251 is connected to the fourth communication pin 222, and a fourth terminal of the third switch 251 is connected to the first CC pin 221; and a first terminal of the fourth switch 252 is connected to the second terminal of the first resistor 233, and a second terminal of the fourth switch 252 is connected to the second CC pin 223, where in a case that the data cable 2 is connected to both the first charger and the first to-be-charged device, the first terminal of the third switch 251 is connected to the fourth terminal of the third switch 251, and the first terminal of the fourth switch 252 is disconnected from the second terminal of the fourth switch 252; or in a case that the data cable 2 is connected to the second charger or the second to-be-charged device, the first terminal of the third switch 251 is connected to the third terminal of the third switch 251, and the first terminal of the fourth switch 252 is connected to the second terminal of the fourth switch 252.

In this implementation, the third switch 251 may be a switch controlled by an analog signal, for example, a metal oxide semiconductor (MOS transistor). Certainly, the third switch 251 may be alternatively a switch controlled by a digital signal, for example, a single-pole three-throw switch. The corresponding fourth switch 252 may also be a switch controlled by an analog signal or a switch controlled by a digital signal. In addition, as shown in FIG. 4, when each of the third switch 251 and the fourth switch 252 is a switch controlled by a digital signal, a second control unit 26 may be further disposed in a second processing module 24, to send a corresponding digital control signal by using the second control unit 26, so as to control the third switch 251 and the fourth switch 252 to adjust a switch state. A working principle thereof is the same as a working principle of controlling the first switch 151 and the second switch 152 by the first control unit 17, and details are not described herein again.

In this implementation, the second switching unit 25 is set to the third switch 251 and the fourth switch 252, thereby simplifying a structure and a control process of the second switching unit 25.

In an optional implementation, the charger matching unit 24 may be a second ID identification subunit.

In addition, a second control unit 26 is further disposed on the cable 23, and the second control unit 26 is connected to both the charger matching unit 24 and the second switching unit 25, where the second control unit 26 is configured to: when the charger matching unit 24 obtains a second matching signal transmitted via the third communication pin 211 or does not obtain a second matching signal transmitted via the third communication pin 211 within a preset time, drive the first terminal of the second switching unit 25 to be connected to the third terminal of the second switching unit 25 and the first terminal of the second switching unit 25 to be disconnected from the second terminal and the fourth terminal of the second switching unit 25, where the second matching signal is generated by the first charger connected to the data cable 2; and the second control unit 26 is further configured to: when the charger matching unit 24 obtains a second PD charging signal transmitted via the fourth communication pin, drive the first terminal of the second switching unit 25 to be connected to the fourth terminal of the second switching unit 25 and the first terminal of the second switching unit 25 to be disconnected from the second terminal and the third terminal of the second switching unit 25, where the second PD charging signal is generated by the first to-be-charged device connected to the data cable 2 when the data cable 2 is connected to the first charger.

In specific implementation, when the charger matching unit 24 identifies that the second matching signal transmitted via the third communication pin 211 or the second PD charging signal transmitted via the fourth communication pin meets the third preset condition, the charger matching unit 24 sends a third control signal to the second control unit 26; and the second control unit 26 is configured to: in response to the third control signal, drive the first terminal of the second switching unit 25 to be connected to the fourth terminal of the second switching unit 25 and the first terminal of the second switching unit 25 to be disconnected from the second terminal and the third terminal of the second switching unit 25.

When the charger matching unit 24 identifies that the second matching signal transmitted via the third communication pin 211 or the second PD charging signal transmitted via the fourth communication pin meets the fourth preset condition, the charger matching unit 24 sends a fourth control signal to the second control unit 26; and the second control unit 26 is configured to: in response to the fourth control signal, drive the first terminal of the second switching unit 25 to be connected to the third terminal of the second switching unit 25 and the first terminal of the second switching unit 25 to be disconnected from the second terminal and the fourth terminal of the second switching unit 25.

In specific implementation, in a case that the data cable 2 is connected to the mismatched second charger, the third communication pin 211 on the data cable 2 cannot obtain a data signal or a matched analog signal, so that a PD charging protocol channel is disconnected, and only non-PD protocol charging can be implemented.

In this way, in a case that the second ID identification subunit obtains, through the third communication pin 211, a data signal or a corresponding analog signal that meets the third preset condition, it may be determined that the data cable 2 is connected to the matched first charger 1, to first connect to a non-PD charging protocol channel. In implementation, it may be determined, according to a communication result of the to-be-charged device based on the non-PD charging protocol channel, to perform PD charging or DM/DP charging on the to-be-charged device, to connect to a corresponding communication channel.

In this implementation, the second ID identification subunit is connected to the third communication pin 211, so that in a case that the third communication pin 211 is connected to the first CC pin 221, CC handshake protocol communication information can be obtained through the CC channel, and a feedback on the third communication pin 211 is made. For example, the first matching information is fed back to the first ID identification subunit shown in FIG. 4 through the CC channel.

In specific implementation, in a case that the data cable 2 detects that the power supply is connected, the charger matching unit 24 in the data cable 2 may first send the first matching signal to the charger 1, and the data cable matching unit 14 in the charger 1 feeds back the second matching signal to the charger matching unit 24 in response to the first matching signal. This is not specifically limited herein.

In an optional implementation, the Type-A male connector 21 includes a second D+ pin and a second D− pin, and the third communication pin 222 is any one of the second D+ pin and the second D− pin; the Type-C interface 22 includes a third D+ pin and a third D− pin, the fourth communication pin 223 is one that is of the third D+ pin and the third D− pin and that is corresponding to the third communication pin 222; and the cable 23 further includes D+ wire and D− wire, the second D+ pin and the third D+ pin are connected to two terminals of the D+ wire, respectively, and the second D− pin and the third D− pin are connected to two terminals of the D− wire, respectively, where in a case that the data cable 2 is inserted into the charger, the second D+ pin and the second D− pin are connected to the non-PD charging processing unit 13 in the charger.

In this implementation, the non-PD charging processing unit 13 is a charging processing unit of a D+/D− communications protocol, and a function of one of the D+ wire and the D− wire is switched by using the second processing module 12. When being connected to the first CC pin, one of the D+ wire and the D− wire serves as CC communication cabling. When being connected to the fourth communication pin, one of the D+ wire and the D− wire serves as DP/DM communication cabling, to avoid adding of a CC pin to the Type-A male connector 21 and adding of CC cabling to the cable 23, thereby simplifying a cabling structure of the data cable and increasing applicability of the Type-A male connector 21.

It should be noted that in actual application, a structure of the Type-A male connector 21 and a distribution location of each pin correspond to the structure of the Type-A female socket 11 and the distribution location of each pin shown in FIG. 1, FIG. 2, and FIG. 4, and details are not described herein again. Correspondingly, the Type-A male connector 21 may include a VBUS pin, a GND pin, a D+ pin, and a D− pin, the cable 23 also includes VBUS wire, GND wire, D+ wire, and D− wire, and the Type-C interface 22 also includes a VBUS pin, a GND pin, a D+ pin, and a D− pin. Two terminals of the VBUS wire are connected to the VBUS pin of the Type-A male connector 21 and the VBUS pin of the Type-C interface 22, respectively, two terminals of the GND wire are connected to the GND pin of the Type-A male connector 21 and the GND pin of the Type-C interface 22, respectively, two terminals of the D+ wire are connected to the D+ pin of the Type-A male connector 21 and the D+ pin of the Type-C interface 22, respectively, and two terminals of the D− wire are connected to the D− pin of the type-A male connector 21 and the D− pin of the Type-C interface 22, respectively.

For example, the GND pin, the D+ pin, the D− pin, and the VBUS pin are disposed in the Type-A male connector 21. In a case that the first communication pin and the third communication pin are D+ pins, and the Type-A male connector 21 is inserted into the Type-A female socket 11, each pin in the Type-A male connector 21 is connected to each pin in the Type-A female socket 11 in a one-to-one correspondence manner. A corresponding connection relationship is shown in the following Table 1:

TABLE 1

| Type-C interface | Cable | Standard-A male connector |
|---|---|---|
| GND pin | GND wire | GND pin |
| VBUS pin | VBUS wire | VBUS pin |
| CC1 pin | None | None |
| CC2 pin | D+ wire | D+ pin |
| D+ pin | | |
| D− pin | D− wire | D− pin |

Figure 6:
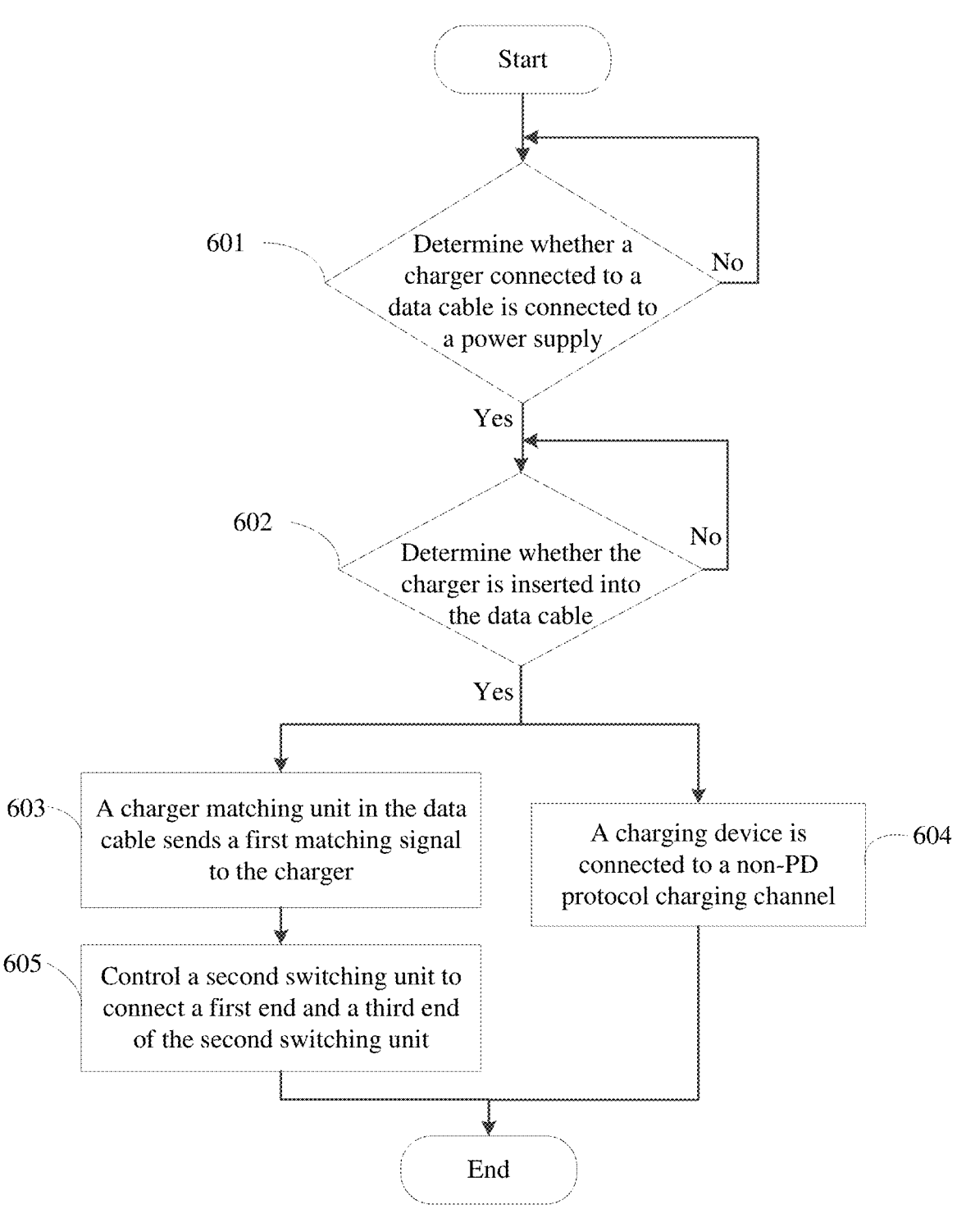
FIG. 6 is a second working flowchart of a charging device according to an embodiment of this application.

As shown in FIG. 6, the following uses an example to describe a working procedure when a data cable is connected to an unmatched charger. The charging device may perform the following steps:

Step 601: Determine whether a charger connected to a data cable is connected to a power supply.

Step 602 is performed in a case that a determining result of this step is "yes"; otherwise, this step is continuously and repeatedly performed.

Step 602: Determine whether the charger is inserted into the data cable.

Step 603 or step 604 is performed in a case that a determining result of this step is "yes"; otherwise, this step is continuously and repeatedly performed.

For example, step 603 is performed in a case that the data cable connected to the charger is the data cable 2 in the embodiment shown in FIG. 4, and step 604 is performed in a case that the data cable connected to the charger is a conventional data cable.

Step 603: A charger matching unit in the data cable sends a first matching signal to the charger.

If a charger connected to a first data cable is a second charger that does not match the first data cable, the second charger does not feed back a second matching signal to the first data cable, that is, receiving a second matching signal on a third communication pin meets a fourth preset condition, and therefore step 605 is performed.

Step 605: Control a second switching unit to connect a first terminal and a third terminal of the second switching unit.

It should be noted that, by default, the second switching unit connects the first terminal and a second terminal of the second switching unit.

Step 604: A charging device is connected to a non-PD protocol charging channel.

It should be noted that after step 604 or step 605, a non-PD protocol charging channel in the charger and the data cable is connected, and a PD protocol charging channel in the data cable is not connected. The to-be-charged device may communicate with the charging device based on a non-PD communications protocol, and determine a charging solution according to communication content.

Referring to FIG. 1 and FIG. 4, FIG. 1 and FIG. 4 are structural diagrams of a charging device according to an embodiment of this application. The charging device includes the charger 1 and the data cable 2 provided in the foregoing embodiments. The first communication pin 111 is connected to the third communication pin 211.

in a case that the data cable 2 successfully matches the charger 1 and is not connected to the first to-be-charged device, the first terminal of the first switching unit 15 is connected to the fourth terminal of the first switching unit 15, the first terminal of the first switching unit 15 is disconnected from the second terminal and the third terminal of the first switching unit 15, the first terminal of the second switching unit 25 is connected to the third terminal of the second switching unit 25, and the first terminal of the second switching unit 25 is disconnected from the second terminal and the fourth terminal of the second switching unit 25; and in a case that the data cable 2 successfully matches the charger 1 and is connected to the first to-be-charged device, the first terminal of the first switching unit 15 is connected to the second terminal of the first switching unit 15, the first terminal of the first switching unit 15 is disconnected from the third terminal and the fourth terminal of the first switching unit 15, the first terminal of the second switching unit 25 is connected to the fourth terminal of the second switching unit 25, and the first terminal of the second switching unit 25 is disconnected from the second terminal and the third terminal of the second switching unit 25, where in a case that the data cable 2 is connected to the first to-be-charged device, the charging device performs PD charging on the to-be-charged device through the first CC pin 221; or in a case that the data cable 2 is connected to the second to-be-charged device, the charging device performs non-PD charging on the to-be-charged device through the fourth communication pin 222.

It should be noted that, in this embodiment, a specific working process of the charging device corresponds to a working process of the charger 1 and the data cable 2 in the foregoing embodiment, and details are not described herein again.

In an optional implementation, in a case that the charger 1 is connected to the power supply and the data cable 2 is not connected to the to-be-charged device, the charger 1 mutually matches the data cable 2; and when the charger 1 successfully matches the data cable 2, the first switching unit 15 is configured to connect the first communication pin 111 to the non-PD charging processing unit 13, and the second switching unit 25 is configured to connect the third communication pin 211 to the fourth communication pin 222.

In this implementation, after the charger 1 successfully matches the data cable 2, a charging signal of the to-be-charged device may be received by using the third communication pin 211 and the fourth communication pin 222, and states of the first switching unit 15 and the second switching unit 25 are adjusted according to the charging signal. For example, in a case that the charging signal is a PD charging signal, the first switching unit 15 connects the first communication pin 111 to the PD charging processing unit 12, and the second switching unit 25 connects the third communication pin 211 to the first CC pin 221 to perform PD fast charging on the charging device.

In an optional implementation, in a case that the charger 1 is connected to the power supply, a first target unit is configured to generate a first matching signal and transmit the first matching signal to a second target unit; and the second target unit sends a second matching signal to the first target unit, where in a case that the first target unit receives the second matching signal, the first target unit determines that the first target unit matches the second target unit; and in a case that the second target unit receives the first matching signal, the second target unit determines that the first target unit matches the second target unit, where the first target unit is one of the data cable matching unit 14 and the charger matching unit 24, and the second target unit is the other of the data cable matching unit 14 and the charger matching unit 24.

In this implementation, matching signal interaction between the data cable matching unit 14 and the charger matching unit 24 is used to determine whether the charger 1 matches the data cable 2, thereby simplifying a matching process between the charger 1 and the data cable 2.

Referring to FIG. 7, FIG. 7 is a flowchart of a first charging method according to an embodiment of the present invention. The charging method is applied to a charging device including the charger 1 provided in the embodiments of this application. The charging device may perform the following steps:

Step 701: In a case that the charger is connected to a data cable, the charger is connected to a power supply, and the data cable is connected to a to-be-charged device, a data cable matching unit obtains a first matching signal.

Step 702: In a case that the first matching signal meets a first preset condition, drive a first switching unit to connect a first communication pin to a PD charging processing unit.

Step 703: In a case that the first matching signal meets a second preset condition, drive the first switching unit to connect the first communication pin to a non-PD charging processing unit.

It should be noted that in specific implementation, only one of step 702 and step 703 is performed. The flowchart shown in FIG. 7 is only used as an example.

In specific implementation, in a case that the power supply is detected on VBUS wire, it may be determined that the charger is connected to the power supply and the target data cable is connected to the to-be-charged device.

The first charging method provided in this embodiment of this application can implement the processes of the charger provided in the embodiments of this application, and can achieve a same beneficial effect. To avoid repetition, details are not described herein again.

Referring to FIG. 8, FIG. 8 is a flowchart of a second charging method according to an embodiment of the present invention. The charging method is applied to a charging device including the data cable 2 provided in the embodiments of this application. The charging device may perform the following steps:

Step 801: In a case that the data cable is connected to a charger, the charger is connected to a power supply, and the data cable is connected to a to-be-charged device, a charger matching unit obtains a second matching signal.

Step 802: In a case that the second matching signal meets a third preset condition, drive a second switching unit to connect a third communication pin to a first CC pin.

Step 803: In a case that the second matching signal meets a fourth preset condition, drive the second switching unit to connect the third communication pin to a fourth communication pin.

It should be noted that in specific implementation, only one of step 802 and step 803 is performed. The flowchart shown in FIG. 8 is only used as an example.

The second charging method provided in this embodiment of this application can implement the processes of the data cable provided in the embodiments of this application, and can achieve a same beneficial effect. To avoid repetition, details are not described herein again.

Referring to FIG. 9, FIG. 9 is a flowchart of a third charging method according to an embodiment of the present invention. The charging method is applied to a charging device including the charger 1 and the data cable 2 provided in the embodiments of this application. The charging device may perform the following steps:

Step 901: A data cable matching unit of the charger receives a first matching signal and sends a second matching signal to a charger matching unit of the data cable in a case that the data cable is connected to the charger, a power supply and a to-be-charged device.

Step 902: The charging device performs PD protocol communication with the to-be-charged device in a case that the data cable matching unit determines that the first matching signal meets a first preset condition, and the charger matching unit determines that the second matching signal meets a third preset condition.

Step 903: The charging device performs non-PD protocol communication with the to-be-charged device in a case that the data cable matching unit determines that the first matching signal meets a second preset condition, and the charger matching unit determines that the second matching signal meets a fourth preset condition.

It should be noted that in specific implementation, only one of step 802 and step 803 is performed. The flowchart shown in FIG. 8 is only used as an example.

Optionally, after the charger is connected to the power supply and before the data cable is connected to the to-be-charged device, the method further includes:

matching the data cable connected to the charger with the charger; and if the charger successfully matches the data cable, driving the first switching unit to connect a first communication pin to a non-PD charging processing unit, and driving the second switching unit to connect a third communication pin to a fourth communication pin; and the receiving, by a data cable matching unit of the charger, a first matching signal and sends a second matching signal to a charger matching unit of the data cable in a case that the data cable is connected to the charger, a power supply and a to-be-charged device includes:

receiving, by the data cable matching unit of the charger, the first matching signal sent by the to-be-charged device and sending the second matching signal to the charger matching unit of the data cable in a case that the data cable is connected to the charger, the power supply and the to-be-charged device.

The matching the data cable connected to the charger with the charger may be: detecting whether the data cable matching unit in the charger obtains the first matching signal from the first communication pin, and determining that the first matching signal meets the first preset condition or the second preset condition; and detecting whether the charger matching unit in the data cable obtains the second matching signal from the third communication pin, and determining that the second matching signal meets the third preset condition or the fourth preset condition. The matching process is the same as the matching process in the embodiments of the charger, the data cable, and the charging device provided in the embodiments of this application. Details are not described herein again.

Optionally, the performing, by the charging device, PD protocol communication with the to-be-charged device in a case that the data cable matching unit determines that the first matching signal meets a first preset condition, and the charger matching unit determines that the second matching signal meets a third preset condition includes:

in a case that the first matching signal instructs to perform PD protocol communication between the to-be-charged device and the charging device, driving the first switching unit to connect the first communication pin to the PD charging processing unit, driving the second switching unit to connect the third communication pin to a first CC pin, and performing PD communication protocol charging on the to-be-charged device.

The performing, by the charging device, non-PD protocol communication with the to-be-charged device in a case that the data cable matching unit determines that the first matching signal meets a second preset condition, and the charger matching unit determines that the second matching signal meets a fourth preset condition includes:

in a case that the first matching signal instructs to perform non-PD protocol communication between the to-be-charged device and the charging device, performing non-PD communication protocol charging on the to-be-charged device by using the non-PD charging processing unit.

According to the charging device provided in this embodiment of this application, a first communication pin in a data cable is used as a switchable communication pin, to support one of a PD charging protocol and a non-PD charging protocol by using the first communication pin. Therefore, after a charging device is connected to a power supply, a PD fast charging function or a non-PD fast charging function can be provided for a to-be-charged device according to selection of the to-be-charged device. This has a same beneficial effect as the charging device provided in this embodiment of this application, and details are not described herein again.

Optionally, an embodiment of this application further provides an electronic device, including a processor, a memory, and a program or an instruction that is stored in the memory and that can be run on the processor. When the program or the instruction is executed by the processor, the processes of the embodiment of the first charging method, the second charging method, or the third charging method are implemented and a same technical effect can be achieved. To avoid repetition, details are not described herein again.

An embodiment of this application further provides a non-transitory readable storage medium. The non-transitory readable storage medium stores a program or an instruction, and when the program or the instruction is executed by a processor, the processes of the embodiment of the first charging method, the second charging method, or the third charging method are implemented and a same technical effect can be achieved. To avoid repetition, details are not described herein again.

The processor is a processor in the electronic device in the foregoing embodiment. The non-transitory readable storage medium includes a non-transitory computer-readable storage medium, such as a computer read-only memory (ROM), a random access memory (RAM), a magnetic disk, or an optical disc.

An embodiment of this application further provides a chip. The chip includes a processor and a communications interface, the communications interface is coupled to the processor, and the processor is configured to run a program or an instruction to implement the processes of the embodiment of the first charging method, the second charging method, or the third charging method and a same technical effect can be achieved. To avoid repetition, details are not described herein again.

It should be understood that the chip mentioned in this embodiment of this application may also be referred to as a system-level chip, a system chip, a chip system, or an on-chip system chip.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that the scope of the method and the electronic device in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of this application essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of this application.

The embodiments of this application are described above with reference to the accompanying drawings, but this application is not limited to the above specific implementations, and the above specific implementations are only illustrative and not restrictive. Under the enlightenment of this application, those of ordinary skill in the art can make many forms without departing from the purpose of this application and the protection scope of the claims, all of which fall within the protection of this application.

What is claimed is:

1. A charger, comprising a Type-A female socket, a power delivery (PD) charging processing unit, a non-PD charging processing unit, a data cable matching unit, and a first switching unit, wherein the Type-A female socket comprises a first communication pin, the first communication pin is connected to a first terminal of the first switching unit, a second terminal of the first switching unit is connected to the PD charging processing unit, a third terminal of the first switching unit is connected to the data cable matching unit, and a fourth terminal of the first switching unit is connected to the non-PD charging processing unit; and in a case that the charger is connected to a to-be-charged device through a data cable, if the data cable is a first data cable and the to-be-charged device is a first to-be-charged device, the first terminal of the first switching unit is connected to the second terminal of the first switching unit, and the first terminal of the first switching unit is disconnected from both the third terminal and the fourth terminal of the first switching unit; or in a case that the charger is connected to a to-be-charged device through a data cable, if the data cable is a second data cable or the to-be-charged device is a second to-be-charged device, the first terminal of the first switching unit is connected to the fourth terminal of the first switching unit, and the first terminal of the first switching unit is disconnected from both the second terminal and the third terminal of the first switching unit, wherein when the data cable matching unit determines, based on a matching signal transmitted via the first communication pin, that the charger matches the data cable, the data cable is the first data cable, and when the data cable matching unit determines, based on a charging signal transmitted via the first communication pin, that PD protocol communication is performed between the to-be-charged device and the charger, the to-be-charged device is the first to-be-charged device; or when the data cable matching unit determines, based on a matching signal transmitted via the first communication pin, that the charger does not match the data cable, the data cable is the second data cable, and when the data cable matching unit determines, based on a charging signal transmitted via the first communication pin, that non-PD protocol communication is performed between the to-be-charged device and the charger, the to-be-charged device is the second to-be-charged device.

2. The charger according to claim 1, wherein the first switching unit comprises a first switch and a second switch;

a first terminal of the first switch is connected to the first communication pin, a second terminal of the first switch is connected to the data cable matching unit, and a third terminal of the first switch is connected to the non-PD charging processing unit; and a first terminal of the second switch is connected to the first communication pin, and a second terminal of the second switch is connected to the PD charging processing unit, wherein in a case that the charger is connected to the to-be-charged device through the data cable, if the data cable is the first data cable and the to-be-charged device is the first to-be-charged device, the first terminal of the first switch is disconnected from the second terminal and the third terminal of the first switch, and the second switch is closed; or if the data cable is the second data cable or the to-be-charged device is the second to-be-charged device, the first terminal of the first switch is connected to the third terminal of the first switch, the first terminal of the first switch is disconnected from the second terminal of the first switch, and the second switch is open.

3. The charger according to claim 1, wherein the non-PD charging processing unit is a charging processing unit based on a D+/D− communications protocol, the Type-A female socket further comprises a second communication pin, the second communication pin is connected to the non-PD charging processing unit, the first communication pin is one of a first D+ pin and a first D– pin, and the second communication pin is another of the first D+ pin and the first D– pin.

4. The charger according to claim 1, further comprising a first control unit, wherein the first control unit is connected to both the data cable matching unit and the first switching unit, wherein the first control unit is configured to: when the data cable matching unit obtains a first matching signal through the first communication pin or when the data cable matching unit can not obtain a first matching signal through the first communication pin within a preset time, drive the first terminal of the first switching unit to be connected to the fourth terminal of the first switching unit, and drive the first terminal of the first switching unit to be disconnected from the second terminal and the third terminal of the first switching unit, wherein the first matching signal is generated by the first data cable connected to the charger and not connected to the to-be-charged device; and the first control unit is further configured to: when the data cable matching unit obtains a first PD charging signal through the first communication pin, drive the first terminal of the first switching unit to be connected to the second terminal of the first switching unit, and drive the first terminal of the first switching unit to be disconnected from the third terminal and the fourth terminal of the first switching unit, wherein the first PD charging signal is generated by the first to-be-charged device connected to the charger through the first data cable.

5. A data cable, comprising a Type-A male connector, a Type-C interface, and a cable connected between the Type-A male connector and the Type-C interface, wherein a charger matching unit and a second switching unit are disposed on the cable;

the Type-A male connector comprises a third communication pin, the cable comprises first communication cable, the Type-C interface comprises a fourth communication pin and a first CC pin, and the third communication pin is connected to a first terminal of the first communication cable;

a first terminal of the second switching unit is connected to a second terminal of the first communication cable, a second terminal of the second switching unit is connected to the charger matching unit, a third terminal of the second switching unit is connected to the fourth communication pin, and a fourth terminal of the second switching unit is connected to the first CC pin; and in a case that the data cable is connected to both a charger and a to-be-charged device, if the charger is a first charger and the to-be-charged device is a first to-be-charged device, the first terminal of the second switching unit is connected to the fourth terminal of the second switching unit, and the first terminal of the second switching unit is disconnected from the second terminal and the third terminal of the second switching unit; or in a case that the data cable is connected to both a charger and a to-be-charged device, if the charger is a second charger and the to-be-charged device is a second to-be-charged device, the first terminal of the second switching unit is connected to the third terminal of the second switching unit, and the first terminal of the second switching unit is disconnected from the second terminal and the fourth terminal of the second switching unit, wherein when the charger matching unit determines, based on a matching signal transmitted via the third communication pin, that the charger matches the data cable, the charger is the first charger, and when the charger matching unit determines, based on a charging signal transmitted via the third communication pin, that power delivery (PD) protocol communication is performed between the to-be-charged device and the first charger, the to-be-charged device is the first to-be-charged device; or when the charger matching unit determines, based on a matching signal transmitted via the third communication pin, that the charger does not match the data cable, the charger is the second charger, and when the charger matching unit determines, based on a charging signal transmitted via the third communication pin, that non-PD protocol communication is performed between the to-be-charged device and the charger, the to-be-charged device is the second to-be-charged device.

6. The data cable according to claim 5, wherein the Type-C interface further comprises a second CC pin, a first resistor is further disposed on the cable, a first terminal of the first resistor is connected to VBUS wire in the cable, the second switching unit further comprises a fifth terminal and a sixth terminal, the fifth terminal of the second switching unit is connected to a second terminal of the first resistor, and the sixth terminal of the second switching unit is connected to the second CC pin, wherein in a case that the data cable is connected to both the first charger and the first to-be-charged device, the fifth terminal of the second switching unit is disconnected from the sixth terminal of the second switching unit; or in a case that the data cable is connected to the second charger or to the second to-be-charged device, the fifth terminal of the second switching unit is connected to the sixth terminal of the second switching unit.

7. The data cable according to claim 6, wherein the second switching unit comprises a third switch and a fourth switch;

a first terminal of the third switch is connected to the second terminal of the first communication cable, a second terminal of the third switch is connected to the charger matching unit, a third terminal of the third switch is connected to the fourth communication pin, and a fourth terminal of the third switch is connected to the first CC pin; and a first terminal of the fourth switch is connected to the second terminal of the first resistor, and a second terminal of the fourth switch is connected to the second CC pin, wherein in a case that the data cable is connected to both the first charger and the first to-be-charged device, the first terminal of the third switch is connected to the fourth terminal of the third switch, and the first terminal of the fourth switch is disconnected from the second terminal of the fourth switch; or in a case that the data cable is connected to the second charger or the second to-be-charged device, the first terminal of the third switch is connected to the third terminal of the third switch, and the first terminal of the fourth switch is connected to the second terminal of the fourth switch.

8. The data cable according to claim 5, wherein a second control unit is further disposed on the cable, and the second control unit is connected to both the charger matching unit and the second switching unit, wherein the second control unit is configured to: when the charger matching unit obtains a second matching signal transmitted via the third communication pin or does not obtain a second matching signal transmitted via the third communication pin within a preset time, drive the first terminal of the second switching unit to be connected to the third terminal of the second switching unit and the first terminal of the second switching unit to be disconnected from the second terminal and the fourth terminal of the second switching unit, wherein the second matching signal is generated by the first charger connected to the data cable; and the second control unit is further configured to: when the charger matching unit obtains a second PD charging signal transmitted via the fourth communication pin, drive the first terminal of the second switching unit to be connected to the fourth terminal of the second switching unit and the first terminal of the second switching unit to be disconnected from the second terminal and the third terminal of the second switching unit, wherein the second PD charging signal is generated by the first to-be-charged device connected to the data cable when the data cable is connected to the first charger.

9. The data cable according to claim 5, wherein the Type-A male connector comprises a second D+ pin and a second D− pin, and the third communication pin is any one of the second D+ pin and the second D− pin; and the Type-C interface comprises a third D+ pin and a third D− pin, the fourth communication pin is one that is of the third D+ pin and the third D− pin and that is corresponding to the third communication pin, and the first communication cable is any one of D+ wire and D− wire; and the second D+ pin and the third D+ pin are connected to two terminals of the D+ wire, respectively, and the second D− pin and the third D− pin are connected to two terminals of the D-wire, respectively, wherein in a case that the data cable is inserted into the charger, the second D+ pin and the second D− pin are connected to the first D+ pin and the first D− pin in the charger, respectively.

10. A charging device, comprising a charger and a data cable connected to the charger, wherein the charger is the charger according to claim 1, wherein:

the data cable comprises a Type-A male connector, a Type-C interface, and a cable connected between the Type-A male connector and the Type-C interface, wherein a charger matching unit and a second switching unit are disposed on the cable;

the Type-A male connector comprises a third communication pin, the cable comprises first communication cable, the Type-C interface comprises a fourth communication pin and a first CC pin, and the third communication pin is connected to a first terminal of the first communication cable;

a first terminal of the second switching unit is connected to a second terminal of the first communication cable, a second terminal of the second switching unit is connected to the charger matching unit, a third terminal of the second switching unit is connected to the fourth communication pin, and a fourth terminal of the second switching unit is connected to the first CC pin;

in a case that the data cable is connected to both a charger and a to-be-charged device, if the charger is a first charger and the to-be-charged device is a first to-be-charged device, the first terminal of the second switching unit is connected to the fourth terminal of the second switching unit, and the first terminal of the second switching unit is disconnected from the second terminal and the third terminal of the second switching unit; or wherein in a case that the data cable is connected to both a charger and a to-be-charged device, if the charger is a second charger and the to-be-charged device is a second to-be-charged device, the first terminal of the second switching unit is connected to the third terminal of the second switching unit, and the first terminal of the second switching unit is disconnected from the second terminal and the fourth terminal of the second switching unit;

when the charger matching unit determines, based on a matching signal transmitted via the third communication pin, that the charger matches the data cable, the charger is the first charger, and when the charger matching unit determines, based on a charging signal transmitted via the third communication pin, that power delivery (PD) protocol communication is performed between the to-be-charged device and the first charger, the to-be-charged device is the first to-be-charged device; or when the charger matching unit determines, based on a matching signal transmitted via the third communication pin, that the charger does not match the data cable, the charger is the second charger, and when the charger matching unit determines, based on a charging signal transmitted via the third communication pin, that non-PD protocol communication is performed between the to-be-charged device and the charger, the to-be-charged device is the second to-be-charged device;

the first communication pin is connected to the third communication pin;

in a case that the data cable successfully matches the charger and is not connected to the first to-be-charged device, the first terminal of the first switching unit is connected to the fourth terminal of the first switching unit, the first terminal of the first switching unit is disconnected from the second terminal and the third terminal of the first switching unit, the first terminal of the second switching unit is connected to the third terminal of the second switching unit, and the first terminal of the second switching unit is disconnected from the second terminal and the fourth terminal of the second switching unit;

in a case that the data cable successfully matches the charger and is connected to the first to-be-charged device, the first terminal of the first switching unit is connected to the second terminal of the first switching unit, the first terminal of the first switching unit is disconnected from the third terminal and the fourth terminal of the first switching unit, the first terminal of the second switching unit is connected to the fourth terminal of the second switching unit, and the first terminal of the second switching unit is disconnected from the second terminal and the third terminal of the second switching unit, in a case that the data cable is connected to the first to-be-charged device, the charging device performs PD charging on the to-be-charged device through the first CC pin; or in a case that the data cable is connected to the second to-be-charged device, the charging device performs non-PD charging on the to-be-charged device through the fourth communication pin.

11. The charging device according to claim 10, wherein when the charger is connected to a power supply and the data cable is not connected to the to-be-charged device, the charger mutually matches the data cable; and when the charger successfully matches the data cable, the first switching unit is configured to connect the first communication pin to the non-PD charging processing unit, and the second switching unit is configured to connect the third communication pin to the fourth communication pin.

12. The charging device according to claim 11, wherein when the charger is connected to the power supply, a first target unit is configured to generate a first matching signal and transmit the first matching signal to a second target unit; and the second target unit sends a second matching signal to the first target unit, wherein in a case that the first target unit receives the second matching signal, the first target unit determines that the first target unit matches the second target unit; and in a case that the second target unit receives the first matching signal, the second target unit determines that the first target unit matches the second target unit, wherein the first target unit is one of the data cable matching unit or the charger matching unit, and the second target unit is the other of the data cable matching unit or the charger matching unit.

* * * * *